United States Patent [19]

Taylor et al.

[11] Patent Number: 5,204,603
[45] Date of Patent: Apr. 20, 1993

[54] OPEN CIRCUIT DETECTION FOR A PULSED RESOLVER POSITION SENSING SYSTEM

[75] Inventors: Donald K. Taylor, Piney Flats; Richard J. Maczka; Carl H. Russell, III, both of Johnson City, all of Tenn.

[73] Assignees: Siemens Industrial Automation, Inc., Johnson City, Tenn.; Comau S.p.A., Turin, Italy

[21] Appl. No.: 828,049

[22] Filed: Jan. 30, 1992

[51] Int. Cl.$^5$ .................................. G05B 1/06
[52] U.S. Cl. .............................. 318/657; 318/654; 318/661; 318/603
[58] Field of Search .................. 318/560–572, 318/660–680; 340/347 SY, 870.04, 870.05, 870.32, 870.34; 328/155; 364/559, 571

[56] References Cited

U.S. PATENT DOCUMENTS

| | | | |
|---|---|---|---|
| 3,562,619 | 2/1971 | Hyoguchi | 318/603 |
| 4,011,440 | 3/1977 | Steglich . | |
| 4,079,374 | 3/1978 | Cox, Jr. . | |
| 4,323,884 | 4/1982 | Durandeau et al. | 318/657 |
| 4,328,483 | 5/1982 | Swartz et al. | 318/654 |
| 4,352,050 | 9/1982 | Sakano . | |
| 4,355,305 | 10/1982 | Cordina et al. | 318/565 X |
| 4,472,669 | 9/1984 | Denham et al. | 318/661 |
| 4,511,884 | 4/1985 | Serev et al. . | |
| 4,553,078 | 11/1985 | Wise | 318/592 |
| 4,631,523 | 12/1986 | Ono et al. . | |
| 4,672,279 | 6/1987 | Hosokawa et al. . | |
| 4,710,770 | 12/1987 | Hakata et al. . | |
| 4,712,106 | 12/1987 | McNally . | |
| 4,740,778 | 4/1988 | Harding et al. | 324/161 |
| 4,792,754 | 12/1988 | Pournain . | |
| 4,795,954 | 1/1989 | Sakurai et al. . | |
| 4,952,852 | 8/1990 | Bando et al. | 318/434 |
| 4,970,450 | 11/1990 | Karl et al. . | |
| 4,988,273 | 1/1991 | Faig et al. | 318/254 |
| 5,038,272 | 8/1991 | Calcagno et al. | 318/563 |
| 5,092,051 | 3/1992 | Holmer et al. . | |

Primary Examiner—Paul Ip
Attorney, Agent, or Firm—Donald M. Boles

[57] ABSTRACT

An auxiliary resolver position tracking (RPT) system for an industrial robot includes a resolver excitation and monitoring system which is powered by an uninterruptable power supply which includes a battery. The RPT system generates trapezoidal excitation pulses for the resolvers in the robot when no external excitation signal is applied, for example when the robot is shut down. Since there is relatively little motion to be detected in these instances, the RPT system switches between a slow position sampling rate, when no motion is detected, and a fast sampling rate when motion is detected. When operating on battery power, the RPT only switches to the fast sampling rate when motion is detected. To ensure that no motion data is lost when the system switches back to the slow sampling rate, the high sampling rate is maintained for a time sufficient to capture any residual motion of the robot. In addition, the RPT includes circuitry to detect when the external excitation signal is absent, to detect when individual invalid position samples may be taken and to distinguish between valid motion and a jitter condition in which the sensed resolver position oscillates between two quadrants.

3 Claims, 9 Drawing Sheets

OPEN CIRCUIT DETECTION FOR A PULSED RESOLVER POSITION SENSING SYSTEM

FIELD OF THE INVENTION

The present invention relates generally to a device for recording the position reached by a moving part moved by a rotary motor. In particular, the present invention relates to a device which tracks the position of a group of servomotors during power down conditions.

BACKGROUND OF THE INVENTION

Presently, in order to record the positions reached by a moving part (such as the multiple axis, moving arm of an industrial robot) it is common to use an angular-position transducer associated with the motor that moves the part. The transducer, usually consisting of a resolver, generates a signal indicating the angular position reached by the motor during a rotation. Since a typical industrial robot includes several axes of movement, it is desirable to use several resolvers so that movement may be monitored for each axis. The signal generated by the resolver associated with each axis of movement of the robot arm is transmitted to a general control unit (or servo controller—SC) which accumulates the signal produced by each resolver (i.e. each axis of movement) to continually provide an absolute indication of the position of the robot arm.

One of the main drawbacks of such a system occurs when the robot is separated from its servo control (for example, in order to transfer it from the production premises to the user location or from one user location to another) or when the servo controller is momentarily powered down (for example, following a power failure). In this instance, the information relating to the position reached by each moving part is lost. In such a case, it may be necessary to completely recalibrate the position tracking system before it may be restarted.

These loss of power situations are complicated by the fact that the robot arm continues to move for a few moments as a result of inertia, until it reaches a final stop position. This final stop position is not recorded by the main position tracking system since the position tracking system in the SC (as well as the robot arm and the resolvers) is no longer receiving operational power. Complicating manners still further, is the possibility that the robot arm may be moved by external forces during transport or by factory workers while powered down.

The effects of the above-mentioned drawbacks may be lessened, at least in part, by using two cascade-connected angular transducers. Two resolvers coupled together via a speed reduction mechanism is an example of such a device.

According to this configuration, the first resolver registers the momentary position reached during a rotation by the motor actuating the moving part, or the second resolver connected to the first resolver via a speed reduction mechanism, such that the second resolver itself performs a single rotation during multiple rotations of the first resolver. Using this configuration, the position of the moving part may be "read" from the two resolvers when the SC is restarted.

This solution, know as a master/vernier or coarse/fine type, is impractical both in terms of space (two resolvers and a speed reduction mechanism must be provided for each axis of movement of the robot) and in terms of cost (two resolvers with the associated precision gearing cost, in fact, more than a single resolver keyed onto the drive shaft).

Another solution is disclosed in U.S. Pat. No. 5,038,272 entitled "DEVICE FOR TRACKING AND RECORDING THE POSITION REACHED BY A MOVING PART, IN PARTICULAR FOR INDUSTRIAL-ROBOT CONTROL", which is hereby incorporated by reference for its teaching on position tracking for industrial robots.

In this system, an auxiliary resolver position tracking system is integrally coupled to the industrial robot and powered by an uninterruptable power supply which includes, for example, a battery. The system monitors the excitation signal applied to the resolvers and the output signals provided by the resolvers to maintain position information for the various axes of rotation. When a failure in the excitation signal is detected, the auxiliary system generates a substitute excitation signal so that it may continues to monitor the output signals of the resolvers.

This system has disadvantages because the battery limits the time during which it may monitor the position information returned by the resolvers. The resolver excitation signals are desirably provided at relatively high current levels and, so, tend to drain the battery rapidly. The size of the battery which may be used in the resolver position tracking system is limited since it is desirable to package the position tracking system with the robot.

SUMMARY OF THE INVENTION

The present invention provides a device and method for recording the position reached by a moving part moved by rotating shaft which, even if there is a failure in the external power supply, is able to retain the information relating to the position reached by the moving part of the a robot arm with respect to all of its possible axes of movement. Aside from having an auxiliary power supply to compensate for the loss of main power to the robot, the position tracking system of the present invention includes several power conservation systems which are operable when the auxiliary power supply is engaged, so that it may maintain position information without using excessive battery current.

According to one aspect of the invention, when a failure in the external power supply occurs, this system of the present invention is activated automatically without any loss of resolver position information. While the external power failure continues, in order to minimize the amount of energy used by the auxiliary power supply, the present invention has at least two sampling rates for sampling the resolvers to determine whether any motion has occurred. Thus, during periods of no motion during a main power failure, a relatively low frequency signal is used to sample the output signals of the resolver to minimize the use of an auxiliary power. When motion is detected, however, a higher frequency sampling rate is activated to prevent any loss of position information.

According to another aspect, the present invention provides for avoiding false motion conditions such as "jitter" in detecting motion. Jitter detection involves determining the present and two preceding positions of the resolver. The two preceding positions are stored in a register. By comparing the three registers against a "look-up" table of possible conditions, the system can detect whether actual motion has occurred or whether a jitter condition, that is to say an oscillation between quadrants of the motor has occurred.

According to another aspect of the invention, the system continues to provide a number of fast sampling pulses even after the fast sampling rate has been deactivated, to ensure that any motion occurring during deceleration of the part is adequately tracked. This provision ensures that the time between successive sampling pulses exceeds the possible transition time of the resolver from one quadrant to another, the system switches to the slower sampling rate to preserve auxiliary power, without any loss of position information tracking.

According to another aspect of the invention, the system includes a switching system which passes an excitation signal provided by an external source or an internally generated excitation signal responsive to a control signal. The switching system generates the internal excitation signal suitable for the resolver from a pulse signal. The switching system also controls the switching of the excitation signals so that only one of the excitation signals is applied to the resolver at any one time.

According to another aspect of the invention, the system includes detection circuitry which determines whether an open circuit condition exists in the resolver windings. Upon detecting such an occurrence, the circuitry flags an error condition.

According to yet another aspect of the invention, the system includes circuitry which monitors the external resolver excitation signal to detect intervals during which the excitation signal may not be valid. This circuitry is coupled to other circuitry in the system which ignores position information derived from the output signals of the resolvers during these intervals.

According to another aspect, the system includes circuitry which monitors the external periodic resolver excitation signal to determine when the excitation signal is valid or invalid. This circuitry compares the amplitude of the excitation signal to a predetermined threshold value to produce an output signal which is in a first state when the amplitude is greater than the threshold and in a second state otherwise. The circuitry monitors the output signal for N periods of the excitation signal to determine if the excitation signal is valid.

BRIEF DESCRIPTION OF THE FIGURES

The invention will now be described by way of a non-limiting example, with reference to the attached drawings in which.

DETAILED DESCRIPTION OF THE INVENTION

Figure 1A:
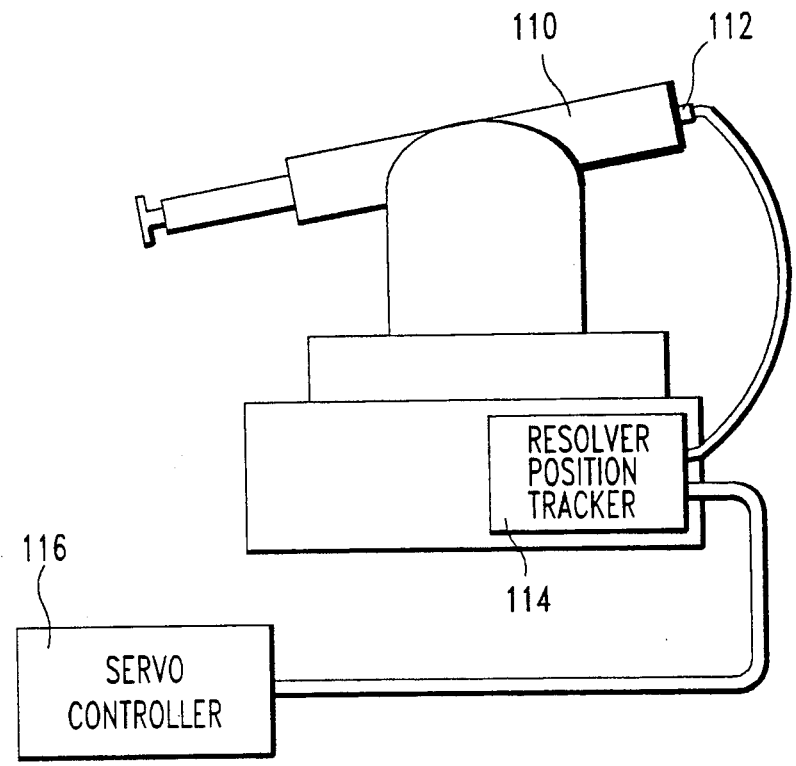
FIG. 1a shows an example robot incorporating the present invention.

FIG. 1a shows an exemplary robot 110 controlled by servo controller 116. Servo controller 116 applies a sinusoidal excitation signal to resolvers 112, coupled to the robot arm 110 and receives position information for the robot arm 110 from the resolvers 112. Resolvers 112 are connected to servo controller through resolver position tracker (RPT) 114. In FIG. 1a, robot 110 and resolvers 112 are being powered by main external power supply (not shown). At the same time, RPT 114 maintains its own internal, auxiliary power supply (not shown) in case of main power failure.

Figure 1B:
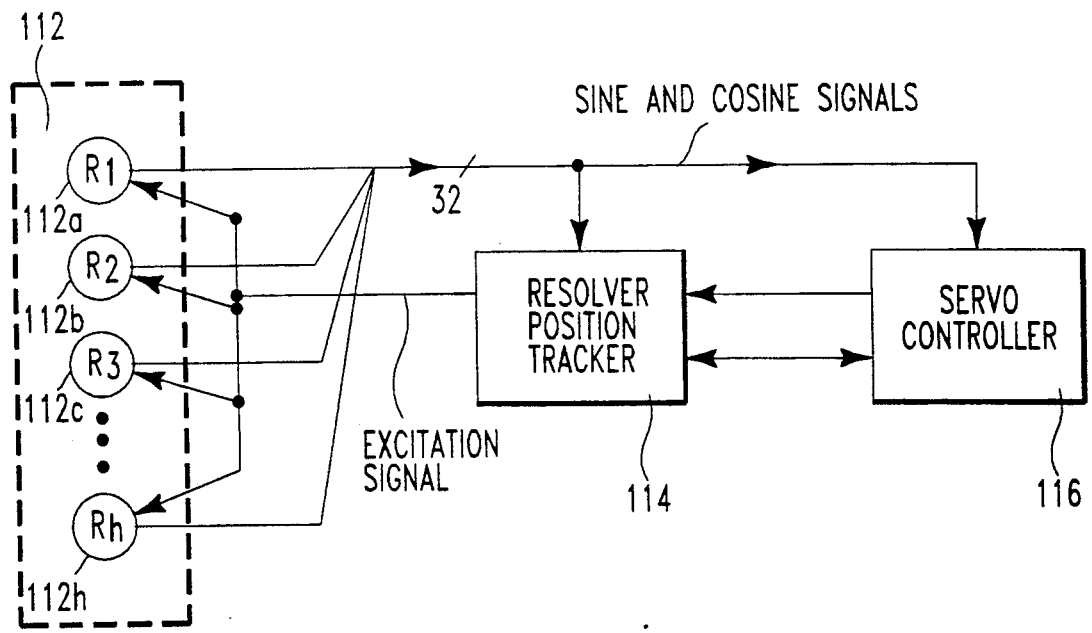
FIG. 1b shows a block diagram of the connections between the resolvers, the resolver position tracker and the servo controller.

Robot 110 may have several axes of movement, the positions of which are tracked by the servo controller 116. In the present examples, robot 110 has eight axes of movement. Consequently, eight resolvers (i.e. one for each axis of movement) are positioned on their corresponding axes in robot 110. FIG. 1b is a block diagram which illustrates the connection of the resolvers 112 (consisting of resolvers 112a–112h) through RPT 114 to servo controller 116.

During normal operation, when there is no power failure or shut down, the servo controller applies a single sinusoidal excitation signal to all of the resolvers 112 and receives two sets of output signals from each resolver. The excitation signal passes through the RPT before it is applied to the resolvers. Signals from the resolvers are applied to the servo controller 116 and the RPT 114 in parallel. In fact, during normal operation, the RPT is only detecting whether power is still present and maintaining a table of resolver positions in case of main power failure or shut down.

In the exemplary embodiment of the invention, each resolver 112a–h may be compared to a small rotating electrical machine consisting of a rotor and of a stator having two windings that are separated by an angle of 90°. Alternatively, the machine may include two windings separated by an angle of 90° on the rotor and one winding on the stator. Each resolver may be coupled, for example, to the shaft of a servomotor which in turn drives the robot on one of its axes of movement. Since each axis of movement of robot 110 is controlled by an individual motor, each motor has a dedicated resolver.

Using the sinusoidal excitation voltage applied to the terminals of the rotor winding of the motor, it is possible to obtain from the two stator windings respective sinusoidal signals which are separated in phase by 90° (i.e. a sine signal and a cosine signal). Taken together, these signals indicate the angular position of the rotor to a relatively high degree of accuracy. The sine signal may be described as $V_{IN}SinO$ and the cosine signal as $V_{IN}CosO$, where $V_{IN}$ is the sinusoidal excitation signal and O is the instantaneous angular position of the resolver rotor with respect to a reference rotor position.

During normal operation of the robot, the servo controller 116 supplies the excitation signal to the resolver. An exemplary excitation signal may be a sinusoidal signal having a frequency of approximately 5 kilohertz (KHz) and an amplitude of approximately 6 volts peak to peak. These values are obviously intended as a guide only.

To be effective, the resolver and servo controller should be capable of monitoring the respective motors while they are rotating at their maximum speeds. Typical values of the motors used in the present invention are in the 3000-4800 RPM range. The acceleration of the respective motors must also be taken into consideration. The present invention, accelerations may be on the order of 800 quadrants/$S^2$.

The sine and cosine signals produced by the resolver are sent to an angular position recording device (not shown) in the servo controller 116. This device determines the angular position of the rotor of the resolver, and thus, the angular position of the corresponding axis of movement to a resolution of, for example, one arc-second.

The detection circuit 218 used in the exemplary RPT 114 is described below with reference to FIG. 6. This circuit determines the angular position of the resolver rotor with a resolution of only one quadrant. The servo controller 116 reads this position information only when it is recovering from a power loss. This resolution is sufficient because servo controller 116 can readily determine the exact position of the resolver within a quadrant by exciting the resolver with a sinusoidal signal and reading the resultant signals provided by the resolver.

Treating the algebraic sign of the sine and cosine signals as a binary one (+) and a binary zero (−), a table can be constructed, such as table 1, showing the quadrant in which the resolver is located. This corresponds directly to the position of the particular axis of the robot control arm.

TABLE

| Quadrant | Angular range | Binary Code |
|---|---|---|
| 1 | 0°–90° | 1,1 |
| 2 | 90°–180° | 0,1 |
| 3 | 180°–270° | 0,0 |
| 4 | 270°–360° | 1,0 |

Figure 2:
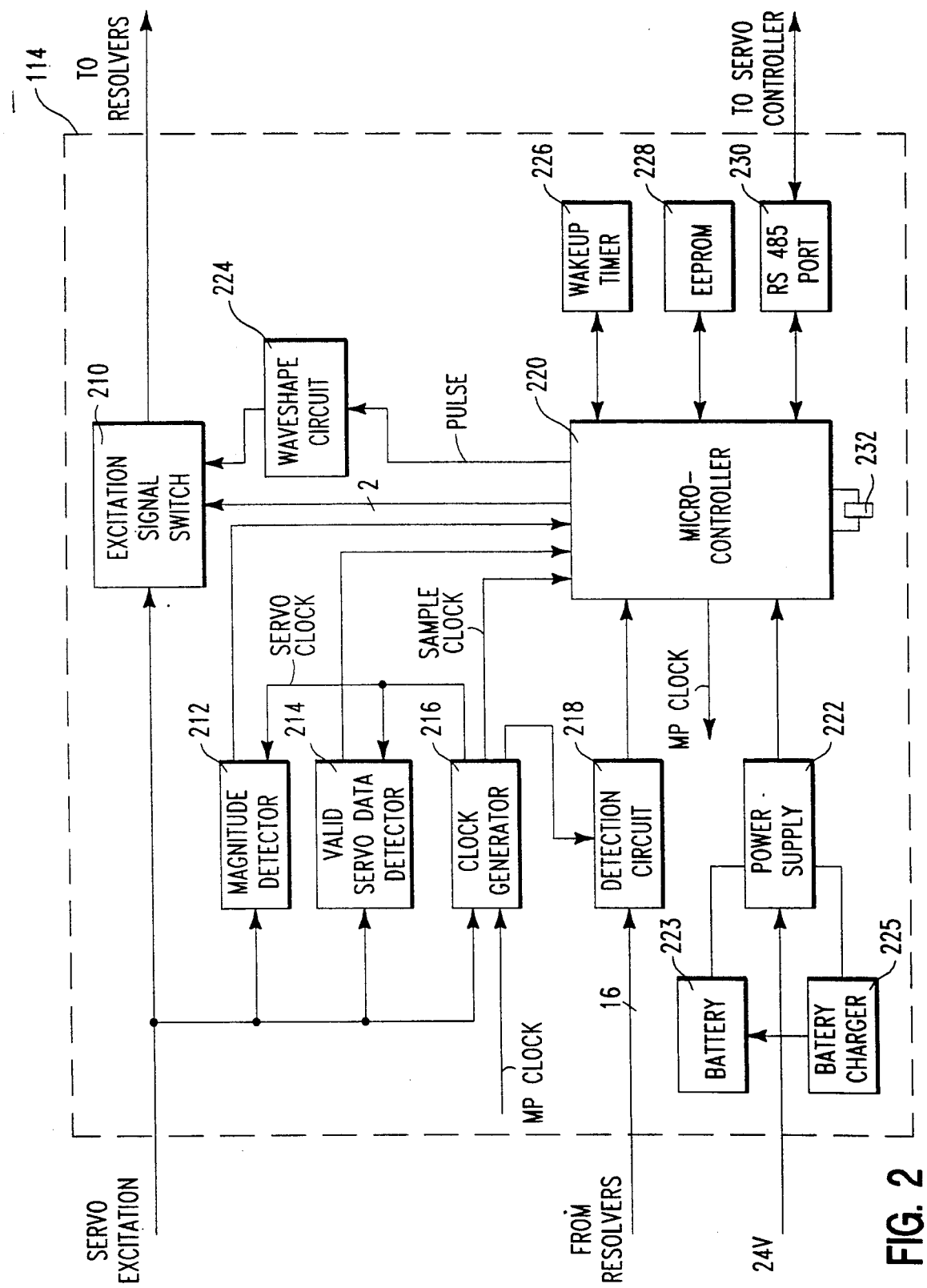
FIG. 2 is a system block diagram of a resolver position tracker which includes an embodiment of the present invention.

FIG. 2 is a block diagram of an exemplary resolver position tracker (RPT) 114. RPT 114 comprises microcontroller 220 which is the control center for carrying out the functions associated with RPT 114. Connected to micro-controller 220 is an excitation signal switch 210, a magnitude detector 212, a valid servo data detector 214 and a clock generator 216. Also connected to micro-controller 220 is a position detection circuit 218, a power supply 222, wave shape circuit 224 a wake-up timer 226, a memory (i.e. EEPROM) 228 and a communications port 230.

The microcontroller 220 used in the exemplary embodiment of the invention is a HPC46003 device available from National Semiconductor. Alternatively, it is contemplated that any of a number of microcontrollers or microprocessors may be used as the device 220. This microcontroller includes 256 bytes of internal random access memory (RAM) storage. In addition, it includes an external memory port, coupled to an electrically erasable programmable read-only memory (EEPROM) 228, an interrupt port, coupled to a wakeup timer 226, a serial input/output (I/O) port coupled to an RS-485 communications port 230 and an internal clock signal generator (not shown) coupled to resonant crystal 232.

In the exemplary embodiment of the invention, the program which controls the operation of the microcontroller 220 is held in the EEPROM 228 which also holds data values that are updated relatively infrequently. Data values which are updated frequently are held in the internal RAM storage area of the microcontroller.

The RPT system shown in FIG. 2 receives a sinusoidal servo excitation signal from the servo controller 116. In the RPT 114, this signal is applied to an excitation signal switch 210 which, in normal operations, passes the signal with minimal distortion to the resolvers 112 in the industrial robot 110. When no external servo excitation signal is available, the excitation signal switch 210 generates an internal excitation signal using a signal provided by the microcontroller 220 via a waveshape circuit 224. The excitation signal switch 210 and waveshape circuit 224 are described below in more detail with reference to FIG. 7.

The external excitation signal is applied to a magnitude detector 212, to a valid servo data detector 214 and to a clock generator 216. The magnitude detector monitors the amplitude of the excitation signal in both the positive and negative polarities and provides a signal to the microcontroller 220. Using this signal, the microcontroller 220 determines whether the excitation signal switch should pass the external excitation signal or produce the internal excitation signal. The microcontroller only switches between the external and internal excitation signals when a trend of, for example, three valid cycles or three invalid cycles of the external excitation signals has been detected. This circuit is described in detail below with reference to FIG. 8.

The valid servo data detector also monitors the servo excitation signal but to determine when distortion in the external excitation signal may cause individual samples from the resolvers 112 to be erroneous. Distortion of this type may be caused, for example by a rapidly varying non-linear load, such as a welding machine, in the electric power distribution system. This circuit is described in detail below with reference to FIG. 9.

Figure 9:
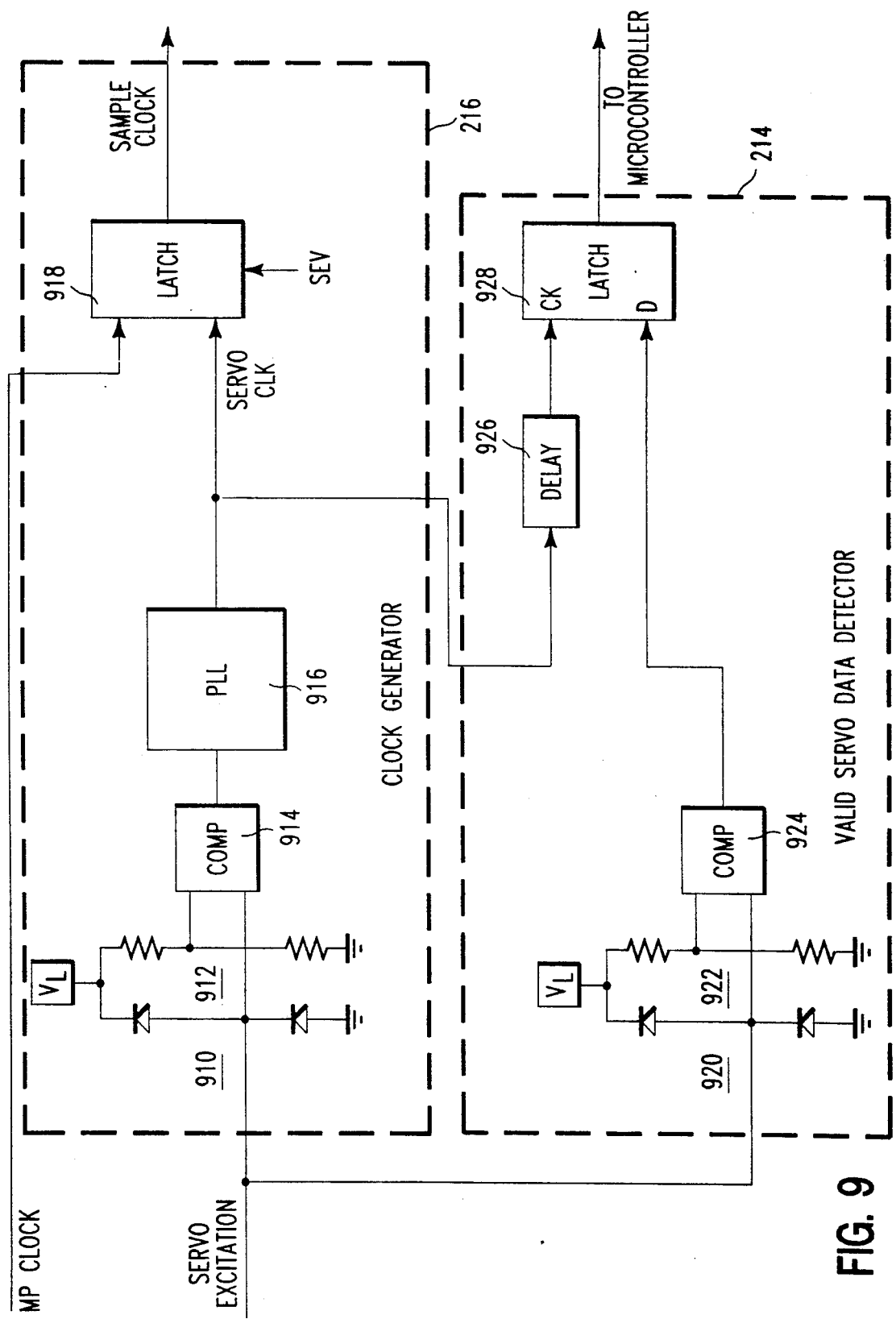
FIG. 9 is a block diagram, partly in schematic diagram form, which shows details of the clock generator and valid servo data detector circuits shown in FIG. 2.

The clock generator circuit 216 is also described in FIG. 9. During normal operation, this circuit generates a SAMPLE CLOCK signal that is locked in phase to the sinusoidal servo excitation signal. When the servo excitation signal is not present, however, the clock generator 216 switches the SAMPLE CLOCK signal to be a 1 KHz clock signal generated by the microcontroller 220.

As described above, in response to the excitation signal, the resolvers 112 produce sine and cosine signals which indicate the positions of the respective axes of motion for the robot 110. These signals are provided to the detection circuit 218 which analyzes the signals to develop an indication of the location of each axis. The microcontroller 220 polls the detection circuitry at a rate determined by a sampling clock signal to maintain a record of the position of each axis.

In addition to monitoring the position of each axis, the detection circuit 218 periodically monitors each of the resolver output signals to detect an open circuit condition in any of the resolver stator windings. Circuitry suitable for use as the detection circuit 218 is described below with reference to FIG. 6.

A key feature of the exemplary resolver position tracking system is its ability to operate in a low-power mode when no external power is applied, in order to conserve power in the battery. The power supply 222 is an important factor in the implementation of this low-power mode. The power supply receives a 24 volt power signal from, for example, the servo controller 116. During normal operation, the power 222 supply uses this 24 volt external power signal to generate all power signals used by the RPT 114. In addition, the power supply 222 includes a battery 223, which is used to power the RPT 114 when the 24 volt signal is absent. A battery charger 225 charges the battery during normal operating conditions to ensure that the battery is available in the event of a power failure.

To further conserve power when the robot is still and the RPT is operating from its battery 223, the RPT 114 enters its low-power mode. In this mode, only the microcontroller 220, clock generator and wakeup timer are continuously powered. The remaining circuitry is only briefly powered at intervals determined by a value that is set in the wake up timer. The RPT 114 only enters its low-power mode when it determines that there is little or no motion on any of the axes of the robot 110. The low-power mode is described in detail below with reference to FIGS. 3c, 3d and 5.

When the RPT is operating during a power outage or shutdown, it is desirable for the resolvers to be excited by a signal from RPT 114. The signal that is used is a trapezoidal pulse generated from a square-wave pulse provided by micro-controller 220. The trapezoidal pulse approximates the analog wave form typically used to energize the resolvers from the windings. The trapezoidal pulse has sufficient slope to operate the resolvers and provide the power ramp up and power ramp down similar to their normal excitation signal. The trapezoidal pulse put out by the RPT has a power level on the order of 6 watts (approximately 1 Ampere at 6 volts).

Figure 6:
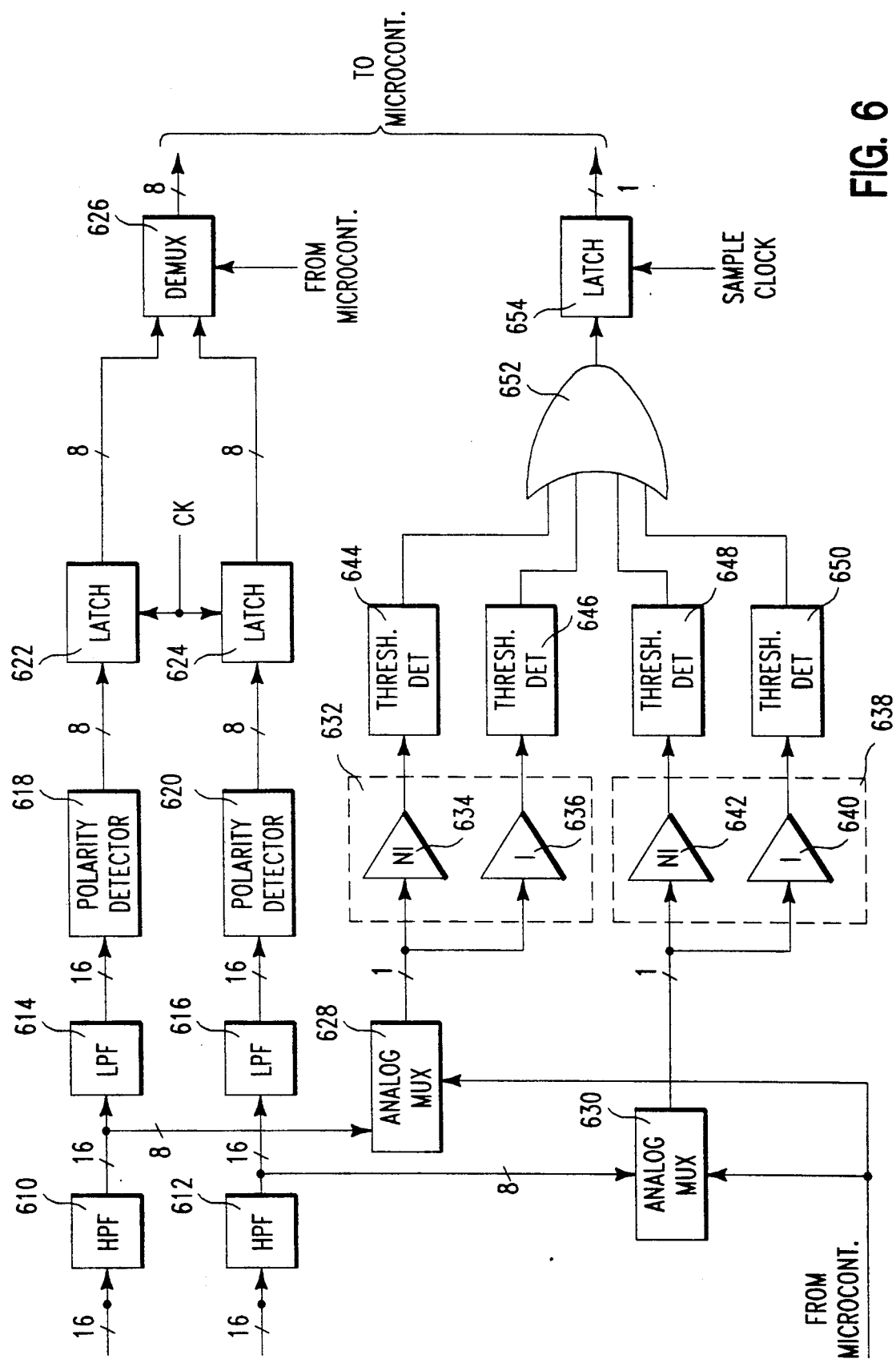
FIG. 6. is a block diagram, partly in logic diagram form, which shows details of the detection circuit of the resolver position tracking system shown in FIG. 2.

FIG. 6 is a block diagram of an exemplary detection circuit 218 which includes a resolver position detector and open circuit detector. The resolver position detector produces an output signal from the multiplexer 626 which tracks the quadrant position of each of the eight resolvers. The open circuit detection system is designed to detect when an open circuit condition exists in the windings of the resolver so that a error condition can be flagged. In response to this error condition, the RPT 114 ignores data from the defective resolver but continues to monitor the other resolvers.

In the exemplary embodiment of the invention, 16 signals, where each signal includes a signal line and a return line, come into high-pass filters 610 and 612 from the eight resolvers 112. Each of the resolvers in resolver set 112 provides two output signals (sine and cosine signals). The purpose of the two output signals is to determine the quadrant location of the resolver in one of the four quadrants through which the resolver can rotate.

The signal and return lines for each of the eight sine signals and eight cosine signals are applied to the high-pass filters 610 and 612. High-pass filter 610 and 612, which may have a −3 dB point of 200 Hz, are designed to eliminate any direct current (DC) components and to substantially attenuate any line frequency components (e.g. 50 Hz or 60 Hz). Both the signal and return lines are processed through the high pass filters to ensure that no DC components are inadvertently added to the sine and cosine signals.

From the high-pass filters, the signals pass through low-pass filters 614 and 616. Low-pass filters 614 and 616 are also designed for noise reduction, more specifically to attenuate relatively high frequency electrical noise which may be generated by adjacent machinery and motors. In the exemplary embodiment of the invention, these filters have a −3 dB point at approximately 7 KHz. Prior to entering low-pass filters, the eight signal lines are split off from each of the sine and cosine signals. These signals are applied to analog multiplexer 628 and 630. Multiplexer 628 and 630 are controlled by a microprocessor such as micro-controller 220 (FIG. 2). Essentially, micro-controller 220 cycles multiplexer 628 and 630 so that one of the eight input signals is provided as its output signal according to a pre-determined rotation or sequence.

The outputs from multiplexers 628 and 630 enter amplification stages 632 and 638 respectively. In each of the amplification stages 632 and 638, there is provided an inverting and non-inverting amplifier. In amplification stage 630, there is non-inverting amplifier 634 and inverting amplifier 636. In amplification stage 638, there is a non-inverting amplifier 642 and an inverting amplifier 640. Set up in this fashion, one of the outputs of amplification stages 632, and 638 will always be positive and of sufficient amplitude to trigger at least one of the threshold detectors 644–650. In the exemplary embodiment of the invention, the amplifiers 632–638 are conventional 224 operational amplifiers.

Threshold detectors 644 and 650 comprise four NPN transistors in the exemplary embodiment of the present invention. The outputs from amplification stages 632 and 638 drive the base-emitter junction of each of these four NPN transistors, respectively. The four collectors of the transistors are wired together in wired OR configuration (the OR gate 652) to generate an active low signal that determines the state of the resolver windings. If there are no "opens" in the stator windings of the resolver, one of the four output signals (2 from amplification stage 632 and two from amplification stage 638) will be greater than zero volts and one of the transistors making up threshold detections to threshold detector 644–650 will pull the output signal "low". The output signal of the OR gate 652 is latched by a conventional latch circuit. This latch is then polled by the microcontroller 220 during the next sampling interval to determine if any of the windings of the selected resolver is exhibiting an open circuit condition.

If the rotor of the resolver is moving, this circuit will detect an open condition in the rotor winding (primary) or either of the two stator (secondary) windings. If the rotor is not moving, however, this circuit will only detect an open condition if the primary winding or both of the secondary windings are open. In an exceptional condition, the circuit will detect an open condition if only one secondary winding is open and the rotor is at a quadrant boundary.

This circuit operates as follows, as long as all secondary windings are operational and the rotor of the resolver is moving, at least one of the sine, cosine, inverted sine or inverted cosine signals will be positive at all times. Thus, at least one of the threshold detectors 644–650 will provide a logic-high value to the OR gate 652 and the output signal of the OR gate 652 will be logic-high. If, however, the rotor is moving and either of the secondary windings of the resolvers is open, at some time, all of the sine or cosine output signals for the resolver will be zero. This event forces the output signal of the amplification stages 632 through 638 to be below the turn-on voltage of their corresponding threshold detectors 644-650. In this instance, all four threshold detectors are off and the open signal becomes logic-low. This causes signal SAMPLE CLOCK to latch a logic-low signal in the latch 654, and thus detect an open circuit condition. When an open circuit is detected, an error condition is flagged and position data from the flagged resolver is ignored.

The position detector portion of the circuit shown in FIG. 6 operates as follows. During normal operation, the signals from the resolvers leave low-pass filter 614 and 616 and enter polarity detector 618 and 620. Polarity detector 618 and 620 are used to determined which quadrant the resolvers are in. The signals from polarity detectors 618 and 620 are latched in latches 622 and 624 via a clock pulse from micro-controller 222. The output data from latches 622 and 624 is then multiplexed in the multiplexor 626 and provided to the microcontroller 220 which uses the data to determine the angular position of the eight axes and other factors, such as, whether motion or a jitter condition has occurred.

Figure 7:
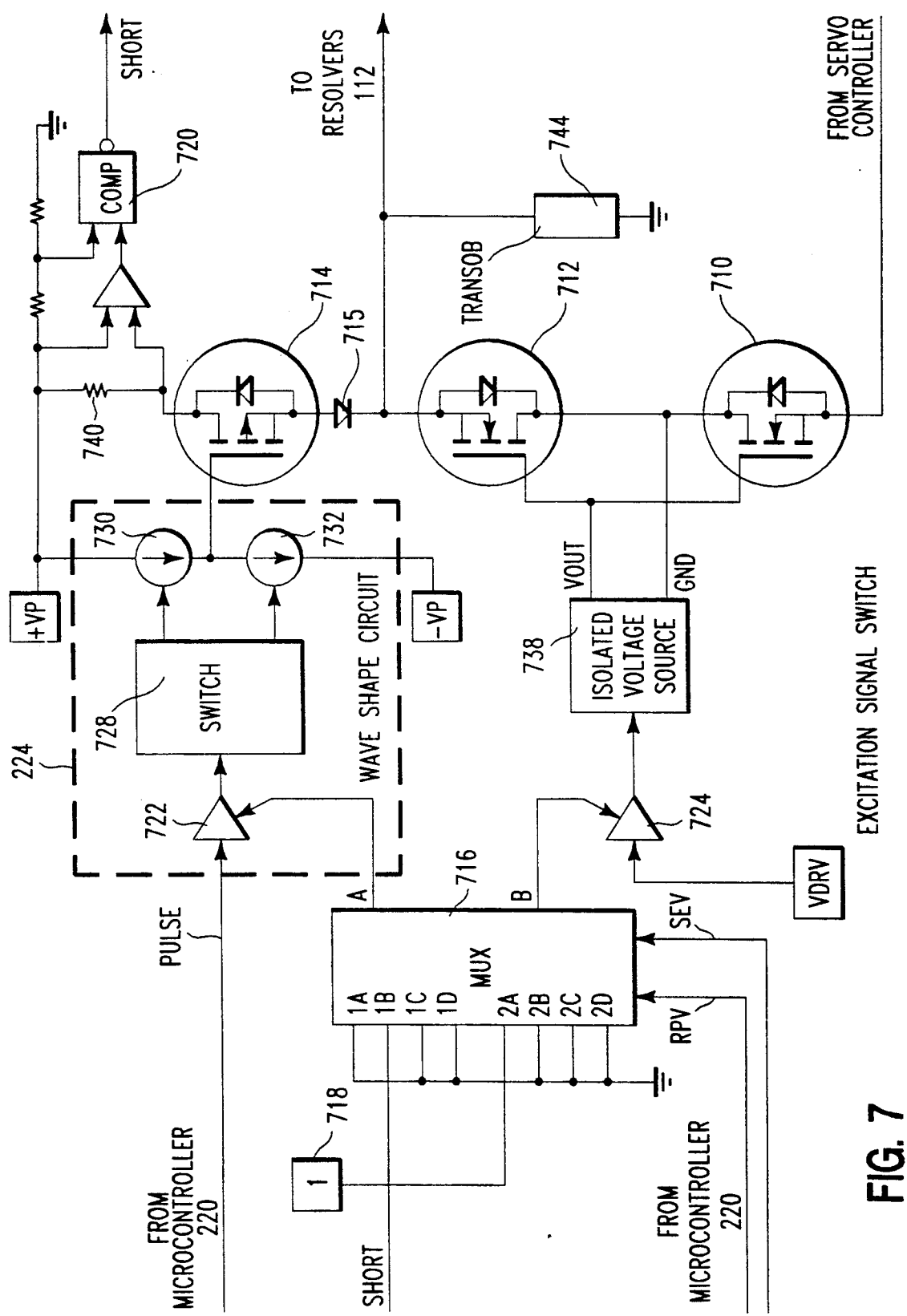
FIG. 7 is a block diagram, partly in schematic diagram form, which shows details of the excitation signal switch of the resolver position tracking system shown in FIG. 2.

FIG. 7 is a block diagram, partly in schematic diagram form of an excitation signal switch suitable for use as the switch 210. In normal operation, the external excitation signal from the servo controller 116 is passed through two N-channel field effect transistors (N-FETs) 710 and 712 to the resolver excitation coils. When, however, the valid servo data detector has detected an invalid servo signal, the micro-controller 220 conditions the switch 210 to generate the internal excitation signal having trapezoidal pulses by modulating the gate electrode of a P-channel field effect transistor (P-FET) 714.

The micro-controller 220 selects which of the internal or external excitation signals is to be applied to the resolvers 112 using control signals RPV and SEV. When RPV is in a logic-high state, the internal excitation signal is selected and when SEV is in a logic high state, the external excitation signal is selected. The micro-controller 220 includes logic to ensure that the signals SEV and RPV are never in a logic-high state at the same time.

The signals SEV and RPV are applied to the control input port of a two-bit four-way multiplexer 716. The data inputs 1A, 1C, 1D, and 2B through 2D are coupled to a source of reference potential (e.g. ground) which acts as a logic-low signal. Data input terminal 2A of the multiplexer 716 is coupled to receive a logic-high signal from a source of logic-high signal 718. Data input terminal 1B of the multiplexer is coupled to receive a signal SHORT provided by a latching COMPARATOR 720.

As set forth below, the signal SHORT is in a logic-low state when a short circuit condition exists in the line that connects the excitation signal to the resolvers or in the rotor winding of one of the resolvers. In normal operation, the signal SHORT is in a logic-high state.

The output signals A and B provided by the multiplexer 716 as a function of the control signals RPV and SEV are shown in Table 2.

TABLE 2

| RPV | SEV | A | B |
|---|---|---|---|
| 0 | 0 | 0 | 0 |
| 0 | 1 | 0 | 1 |

TABLE 2-continued

| RPV | SEV | A | B |
|---|---|---|---|
| 1 | 0 | SHORT | 0 |
| 1 | 1 | 0 | 0 |

Selecting the signal SHORT to control the excitation signal switch when the internal excitation signal is selected inhibits the generation of the internal excitation signal when there is a short-circuit condition in the inputs of the resolvers 112. This protects the RPT 114 from damage which may occur if the P-FET 714 were to drive a short circuit.

As shown in FIG. 7, the signals A and B enable respective amplifiers 722 and 724. When the internal excitation signal is selected, the micro-controller 220 provides a square-wave pulse signal, PULSE, to the excitation signal switch 210. The signal PULSE is passed by the gated amplifier 722 to a switch 728. The switch is responsive to the signal PULSE to activate a controlled current source 732 when PULSE is logic-high and to activate a current source 730 when PULSE is logic-low. The current source 732 drains current from the gate electrode of the P-FET 714 to a voltage source −VP, having a potential less than ground potential, at a relatively low rate. This relatively low current causes the conduction channel of the P-FET 714 to exhibit a logarithmically varying decreasing resistance, generating a signal at its drain terminal which has a slowly rising, positive-going transition. This type of transition is desirable to prevent transient distortion such as "ringing" on the excitation signal. This type of distortion may occur because the excitation signal is driving a reactive load which has the characteristics of a resistor-inductor-capacitor (RLC) circuit.

When the signal PULSE exhibits a negative transition, the switch 728 deactivates current source 732 and activates current source 730. The current source 730 charges the gate capacitance of the P-FET 714 relatively rapidly to a potential +VP, causing the conduction channel of the P-FET 714 to become non-conductive. This rapid transition may cause ringing distortion to occur after the negative-going transition of the excitation signal. This distortion is of minimal significance, however, since, when the internal excitation signal is being used, only the positive-going transition of the excitation signal is relevant to the position samples obtained from the output signals of the resolvers 112. Furthermore, by rapidly turning off P-FET 714, battery power is conserved.

The excitation signal switch shown in FIG. 7 includes a diode 715 which acts to prevent current flow from the N-type transistors 710 and 712 when the external excitation signal is active.

In addition, the excitation signal switch includes a short detector which includes a low-valued (e.g. >1 ohm) resistor 740 that is in series with the supply +VP and the source electrode of the P-FET 714. This resistor is coupled between the inverting and non-inverting input terminals of an operational amplifier 742. The amplifier amplifies the voltage developed across the resistor 740 and applies the result to one input terminal of a latching comparator 720. The other input terminal of the comparator is coupled to receive a reference potential provided by a voltage divider. If the voltage across the resistor ever exceeds the reference potential, the output signal of the comparator latches at a logic-low value.

The signal SHORT is read by the microcontroller 220 during each sample interval. An active short condition (i.e. SHORT=logic-low) causes the microcontroller 220 to flag an error condition and cease operation of the RPT 114.

When the signal B, provided by the multiplexer 716 is logic-high, the amplifier 724 is enabled. This amplifier is coupled to a source of operational potential VDRV. The amplified DC potential provided by the amplifier 724 is applied to an isolated voltage source 738. The source 738 which may, for example, be a DIG-11-8-30-DD device available from Dionics, Inc. includes a bank of light-emitting diodes (not shown) which illuminate a photocell (not shown). In response to this illumination, the photocell develops a potential of, for example, 12 volts across the two output terminals of the source 738. The negative output terminal (GND) of the source 738 is coupled to the interconnected source electrodes of the N-FETs 710 and 712 while the positive output terminal (VOUT) is connected to the gate electrodes. In this configuration, the N-FETs 712 and 710 are always conductive when the output signal B of the multiplexer 716 is in a logic-high state.

The N-FETs used in the exemplary embodiment of the invention are IRF511 devices available from International Rectifier. These devices were selected for their relatively low channel resistance in the conductive state. A low resistance is important since it is desirable to pass the external sinusoidal excitation signal to the resolvers 112 without significant distortion components. An undistorted sinusoidal excitation signal produces the most accurate angular measurements from the resolvers 112.

The excitation signal output terminal of the RPT 114 is shunted to ground by a transient suppressor such as a transorb 744. In the exemplary embodiment of the invention, this device is a model no. DO-215AA available from General Semiconductor Industries, Inc. This transient suppressor acts as a high impedance when the excitation signal is in the normal range of approximately ±6 volts. If, however, the excitation signal exceeds this range in either the positive or negative direction, the transorb 744 exhibits a relatively low impedance, shunting the excess potential to ground. The transorb 744 suppresses transients, such as voltage spikes, which may be caused, for example by near-by lightning strikes or by unshielded equipment operating nearby. In addition, the transorb 744 at least partially suppresses any ringing transients that may occur due to the relatively rapid negative-going transition of the internal excitation signal.

The RPT 114 uses the magnitude detector circuit 212 (FIG. 2) to determine when to switch between passing the external sinusoidal excitation signal and providing the internal trapezoidal excitation signal to the resolvers 112. As described above, the magnitude detector circuit monitors the servo excitation signal to determine if the magnitudes of either the negative or positive polarity portion of the signal has fallen below a preset threshold value.

Figure 8:
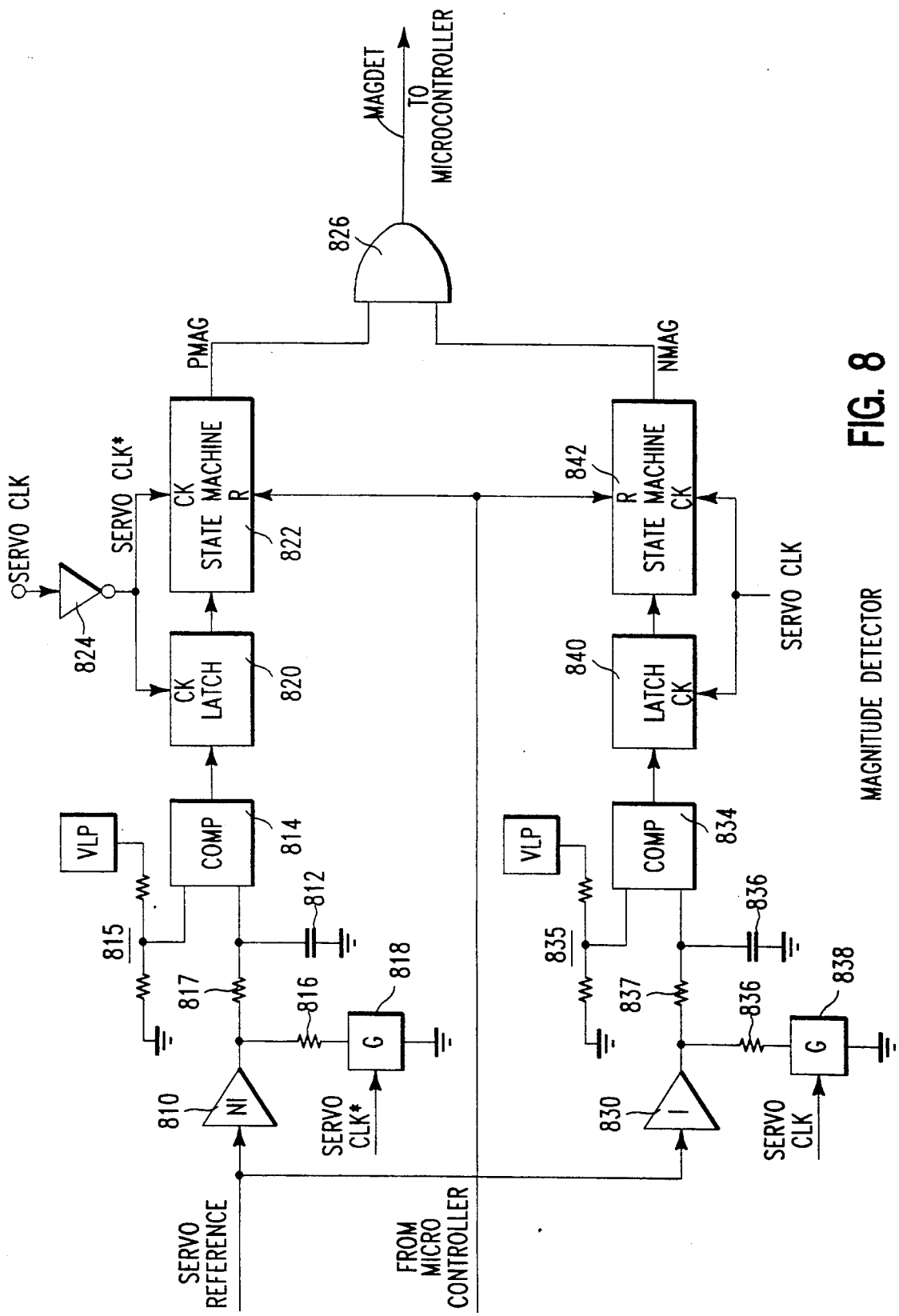
FIG. 8 is a block diagram, partly in schematic diagram form, which shows details of the magnitude detector circuit shown in FIG. 2.

FIG. 8 is a block diagram, partly in schematic diagram form of circuitry suitable for use as the magnitude detector 212. FIG. 8 may be divided into two equivalent parts, a positive peak magnitude detector and a negative peak magnitude detector. For the sake of brevity only the positive peak magnitude detector is described below, followed by a brief description of the differences between it and the negative peak magnitude detector. The positive and negative peak detectors use clock signals derived from the sinusoidal servo excitation signal. As described below with reference to FIG. 9, the clock signal SERVO CLK is locked in phase to the sinusoidal excitation signal and has positive-going transitions substantially coincident with the positive peaks of the excitation signal. An inverted signal, SERVO CLK* is also provided by an inverter 824. The positive-going transitions of this clock signal occur substantially coincident with the negative peaks of the sinusoidal excitation signal.

In the positive peak magnitude detector, the sinusoidal servo excitation signal provided by the servo controller 116 is applied to a non-inverting amplifier 810. The amplifier 810 scales the excitation signal to fit within the dynamic range of a comparator 814. The output signal provided by the amplifier 810 is applied to one terminal of a capacitor 812, the other terminal of which is coupled to ground. In addition, the output terminal of the amplifier 810 is coupled to one terminal of a resistor 816, the other terminal of which is coupled to ground through a gate 818.

During the positive half of one cycle of excitation signal, the gate 818 is open and the output signal of the amplifier charges the capacitor 812 to the positive peak of the excitation signal through the resistor 817. As the capacitor is charging, the comparator 814 is comparing the voltage across the capacitor to a reference voltage provided by a voltage divider circuit 815. If the voltage across the capacitor is greater than the reference voltage, the output signal of the comparator is in a logic-high state. Otherwise it is in a logic-low state.

The combination of resistor 817 and capacitor 812 form a resistor-capacitor (RC) circuit having an RC time constant. This circuit limits the rate at which the capacitor 812 can charge to mitigate any effects of power surges on the capacitor 812.

At the peak of the sinusoidal excitation signal, the signal SERVO CLK* exhibits a positive going transition. This signal causes the latch 820 to store the output signal of the comparator 814 and, simultaneously, causes the gate 818 to close, allowing the capacitor 812 to discharge to ground through the resistors 816 and 817.

In addition to operating the latch 820, the signal SERVO CLK* operates a state machine which compares the value, Q, provided by the latch 820 to the two previously provided values (Q-1 and Q-2). The output signal, PMAG, provided by the state machine indicates whether the magnitude of the positive peaks of the sinusoidal excitation signal is sufficient (PMAG is logic-high) or insufficient (PMAG is logic-low) for three consecutive sampling periods. Table 3 illustrates the operation of the state machine 822.

TABLE 3

| Q-2 | Q-1 | Q | Old PMAG | New PMAG |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 1 |
| 0 | 1 | 0 | 0 | 0 |
| 0 | 1 | 0 | 1 | 1 |
| 0 | 1 | 1 | 0 | 0 |
| 0 | 1 | 1 | 1 | 1 |
| 1 | 0 | 0 | 0 | 0 |
| 1 | 0 | 0 | 1 | 1 |
| 1 | 0 | 1 | 0 | 0 |
| 1 | 0 | 1 | 1 | 1 |
| 1 | 1 | 0 | 0 | 0 |

TABLE 3-continued

| Q-2 | Q-1 | Q | Old PMAG | New PMAG |
|---|---|---|---|---|
| 1 | 1 | 0 | 1 | 1 |
| 1 | 1 | 1 | 0 | 1 |
| 1 | 1 | 1 | 1 | 1 |

The negative peak detector includes inverting amplifier 830, resistor 837, capacitor 832, comparator 834, voltage divider 835, discharge resistor 836, controlled gate 838, latch 840 and state machine 842. This peak detector operates in the same manner as the positive peak detector except that the inverting amplifier 830 produces the magnitude of the negative-going peak of the sinusoidal excitation signal across the capacitor 832. By substituting the clock signal SERVO CLK for the signal SERVO CLK*, this value is compared to the reference value at the proper time and latched into the latch 840. Thus, the output signal NMAG of the state machine 842 indicates whether the magnitude of the negative portion of the sinusoidal excitation signal is sufficient or not sufficient.

The signals PMAG and NMAG are combined by an AND gate 826 to generate a signal MAGDET which is applied to the microcontroller 220. When this signal is in a logic-high state, the sinusoidal excitation signal is valid, otherwise it is invalid. The microcontroller polls this signal when each sample of the signals provided by the detector circuit is taken. As described above, if MAGDET changes state from logic-high to logic-low, the microcontroller 220 (FIG. 2) conditions the excitation signal switch 210 (FIG. 2) to provide the internally generated trapezoidal excitation signal to the resolvers 112 in place of the sinusoidal excitation signal.

Figure 3A:
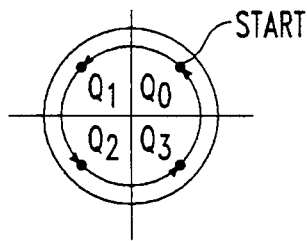
FIGS. 3a and 3b are illustrations of servomotor motion and a jitter condition as detected by the resolver, respectively.
Figure 3B:
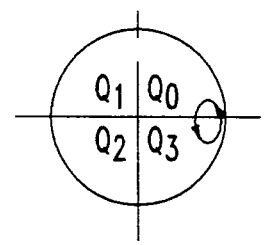
Figure 3C:
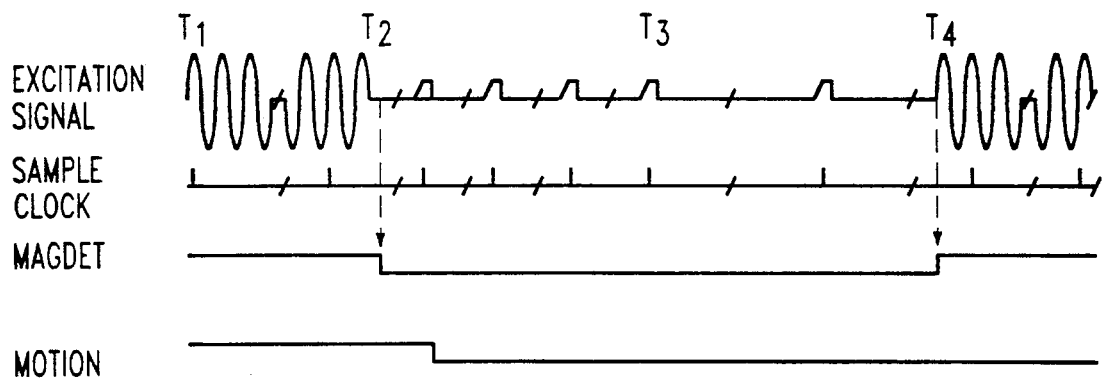
FIGS. 3c and 3d are timing diagram which are useful for describing the different sampling rates used by the resolver position tracker shown in FIG. 2
Figure 3D:
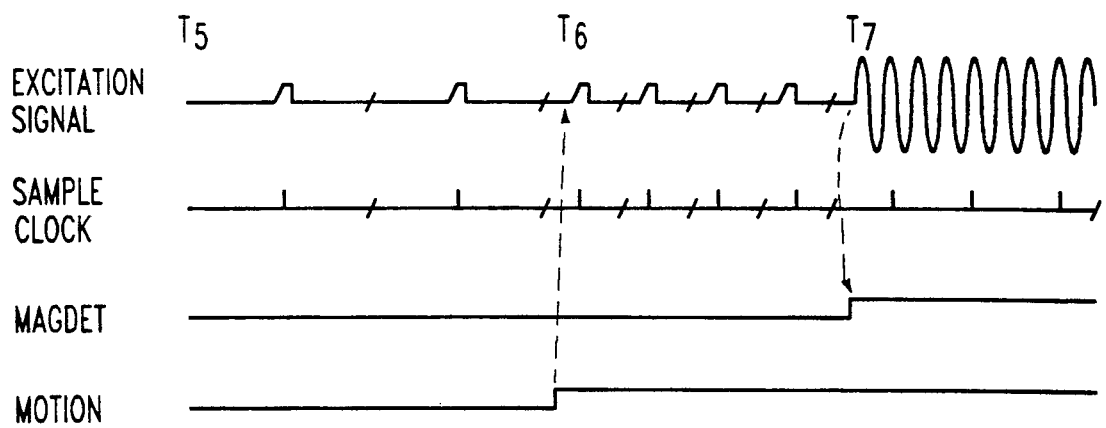

FIGS. 3c and 3d are timing diagrams which illustrate the operation of RPT 114 as it switches between providing the external excitation signal and providing the internal excitation signal at both fast and slow sample rates.

In FIG. 3c, between times T1 and T2, a valid external excitation signal is present and the RPT 114 samples the position of the resolvers using a fast, or high-frequency SAMPLE CLOCK signal. At time T2, the external sinusoidal excitation signal is detected as invalid, as indicated by the signal MAGDET falling from logic-high to logic-low, and the RPT 114 switches to provide the trapezoidal internal excitation signal. The system is operating in the normal mode, using the high frequency SAMPLE CLOCK signal since motion is present at time T2. At time T3, no motion is present and the RPT 114 switches to its low-power operating mode, emitting excitation pulses and taking position samples at a lower rate. This mode is described below with reference to FIG. 5.

At time T4, a valid sinusoidal excitation signal is detected and the RPT 114 switches to provide the sinusoidal excitation signal to the resolvers 112 and to sample the resolver position signals using the fast SAMPLE CLOCK signal.

In FIG. 3d, between times T5 and T6, the RPT 114 is in its low-power mode, issuing excitation pulses and sampling the resolver position using the slow SAMPLE CLOCK signal. At time T6, motion is detected, causing the RPT 114 to switch to its normal mode using the fast SAMPLE CLOCK signal. At time T7, a valid external excitation signal is detected, causing the RPT 114 to switch from providing its internally generated trapezoidal excitation signal to passing the external sinusoidal excitation signal.

During the interval when the sinusoidal excitation signal is failing, for example, immediately prior to time T2, there may be sample intervals when the resolvers 112 are subject to an invalid excitation signal. If the servo controller 116 fails gracefully, there should be no invalid resolver samples since excitation signal levels flagged as invalid by the magnitude detector 212 can still produce valid output signals from the resolvers. If the servo controller fails catastrophically, however, going instantly from a valid signal level to no signal, the detection circuit 218 may produce position samples based on an invalid excitation signal. Invalid samples of this type may also occur if the sinusoidal excitation signal is contaminated with noise signal components.

In the exemplary embodiment of the invention, these invalid sampling intervals are detected by the valid servo data detector 214, shown in FIG. 9. Also shown in FIG. 9 is a block diagram, partly in schematic diagram form of an exemplary clock generator 216. Before describing the valid servo data detector, it is helpful to describe the clock generator 216.

The clock generator produces the clock signal SERVO CLK which is locked in phase to the sinusoidal servo excitation signal. In this circuit, the positive and negative peaks of the external servo excitation signal are clamped to predetermined positive and negative potential values by the action of a pair of diodes 910. The signal produced by the diodes is compared, by a comparator 914, to a reference potential (e.g. 0 volts) generated by a voltage divider 912. The comparator 914 acts to invert the servo excitation signal and to convert it to a square-wave signal. This square-wave signal is applied as a reference signal to a conventional phase-locked-loop (PLL) circuit 916. In response to this reference signal, the PLL 916 produces the clock signal SERVO CLK which is locked in phase to the sinusoidal reference signal and which exhibits negative-going transitions that occur substantially coincident with positive peaks of the sinusoidal excitation signal. As described above, this signal is applied to the magnitude detector 212 and to the valid servo data detector 214.

In addition, the SERVO CLK signal is applied to one input terminal of a multiplexer 918, the other input terminal of which is coupled to receive a signal MP CLOCK which is generated by the microprocessor 220, as described above. The multiplexer 918 is controlled by the signal SEV to provide the SERVO CLK signal or the MP CLOCK signal as its output signal SAMPLE CLOCK when SEV is logic-high or logic-low, respectively. As described above, the signal SAMPLE CLOCK is used by the detection circuit to determine quadrant information from the output signals of the resolvers 112.

The valid servo data detector 216 includes a diode clamp 920, voltage divider 922 and comparator 924 which operate in the same manner as the corresponding components 910, 912 and 914 in the clock generator 214. In the valid servo data detector, however, the output signal of the comparator 924 which indicates whether the positive peaks of the servo excitation signal exceed a predetermined threshold value is stored into a latch 928 synchronous with a signal that is delayed, for example, three microseconds by a delay element 926, with respect to the signal SERVO CLK. The valid servo data detector 216 samples the servo excitation signal at a time delayed with respect to the time that the resolver output data is latched.

The output signal of the latch 928 is polled by the microcontroller 220 each time it receives a position sample from the detection circuit 218. If this signal is in a logic high state then the microcontroller 220 stores the sample value. If, however, this signal is in a logic-low state, indicating an invalid sample value, the microcontroller 220 ignores the sample value. It is better to skip over a possibly invalid sample value when the RPT 114 is operating in synchronism with the sinusoidal servo excitation signal since samples occur with sufficient frequency so that one or two samples may be skipped without producing an invalid sample sequence.

Jitter Detection

FIG. 3a shows an example of movement of one of the resolvers 112 through quadrants $Q_0$–$Q_3$. For purposes of illustration, quadrant position is shown by a small circle in each of the quadrants in the direction indicated by the arrows. Position detection does not necessarily have to take place in the center of each quadrant nor be limited to clockwise or counter clockwise rotation.

FIG. 3b shows the "jitter" condition. During a jitter condition, the resolver (and, thus the motor) oscillates at the boundary between two quadrants. This oscillation occurs when the motor of robot 110 stops at or near the boundary between two quadrants.

During a main power failure or shut down, it is desirable to conserve power by switching the RPT 114 into its low-power mode and using an excitation and sample rate that is slower than when no motion is being detected. When motion is detected, it is desirable to use a faster sampling rate so that no position information is lost. A jitter condition has the potential for being detected as motion since the resolver is sensed as moving from one quadrant to another. This could cause unnecessary power usage by maintaining a fast sample rate when motion is not present.

Jitter is prevented by comparing the current position of the resolver to the last two positions, each time the resolver enters a new quadrant. If the results show an oscillation between adjacent quadrants, a jitter condition in declared and the switch to a faster sampling rate is not made. A jitter control register (JCR) is established which stores the current, previous and next-most-previous position information of the resolver. The JCR is compared to a look-up table to determine the address for the subroutines for determining motion or jitter. The JCR could also be used in a real time calculation comparing the order of the positions in the three registers in the JCR. In table 4, below, the state column indicates the state of motion of the resolver. Column C represents the current quadrant; column $C_1$ represents the last quadrant; $C_2$ represents the next to last quadrant. All possible combinations are shown, although it is understood that "illegal" and "invalid" conditions would be filtered out before reaching the look-up table.

TABLE 4

| STATE | C-2 | C-1 | C | STATE | C-2 | C-1 | C |
|---|---|---|---|---|---|---|---|
| INITIAL | 0 | 0 | 0 | ILLEGAL | 2 | 0 | 0 |
| START_UP | 0 | 0 | 1 | ILLEGAL | 2 | 0 | 1 |
| ILLEGAL | 0 | 0 | 2 | ILLEGAL | 2 | 0 | 2 |
| START_UP | 0 | 0 | 3 | ILLEGAL | 2 | 0 | 3 |
| JITTER | 0 | 1 | 0 | MOTION | 2 | 1 | 0 |
| INVALID | 0 | 1 | 1 | INVALID | 2 | 1 | 1 |
| MOTION | 0 | 1 | 2 | JITTER | 2 | 1 | 2 |
| ILLEGAL | 0 | 1 | 3 | ILLEGAL | 2 | 1 | 3 |
| ILLEGAL | 0 | 2 | 0 | ILLEGAL | 2 | 2 | 0 |
| ILLEGAL | 0 | 2 | 1 | START_UP | 2 | 2 | 1 |
| ILLEGAL | 0 | 2 | 2 | INITIAL | 2 | 2 | 2 |
| ILLEGAL | 0 | 2 | 3 | START_UP | 2 | 2 | 3 |
| JITTER | 0 | 3 | 0 | MOTION | 2 | 3 | 0 |
| ILLEGAL | 0 | 3 | 1 | ILLEGAL | 2 | 3 | 1 |
| MOTION | 0 | 3 | 2 | JITTER | 2 | 3 | 2 |
| INVALID | 0 | 3 | 3 | INVALID | 2 | 3 | 3 |
| INVALID | 1 | 0 | 0 | INVALID | 3 | 0 | 0 |
| JITTER | 1 | 0 | 1 | MOTION | 3 | 0 | 1 |
| ILLEGAL | 1 | 0 | 2 | ILLEGAL | 3 | 0 | 2 |
| MOTION | 1 | 0 | 3 | JITTER | 3 | 0 | 3 |
| START_UP | 1 | 1 | 0 | ILLEGAL | 3 | 1 | 0 |
| INITIAL | 1 | 1 | 1 | ILLEGAL | 3 | 1 | 1 |
| START_UP | 1 | 1 | 2 | ILLEGAL | 3 | 1 | 2 |
| ILLEGAL | 1 | 1 | 3 | ILLEGAL | 3 | 1 | 3 |
| ILLEGAL | 1 | 2 | 0 | ILLEGAL | 3 | 2 | 0 |
| JITTER | 1 | 2 | 1 | MOTION | 3 | 2 | 1 |
| INVALID | 1 | 2 | 2 | INVALID | 3 | 2 | 2 |
| MOTION | 1 | 2 | 3 | JITTER | 3 | 2 | 3 |
| ILLEGAL | 1 | 3 | 0 | START_UP | 3 | 3 | 0 |
| ILLEGAL | 1 | 3 | 1 | ILLEGAL | 3 | 3 | 1 |
| ILLEGAL | 1 | 3 | 2 | START-UP | 3 | 3 | 2 |
| ILLEGAL | 1 | 3 | 3 | INITIAL | 3 | 3 | 3 |

Figure 4:
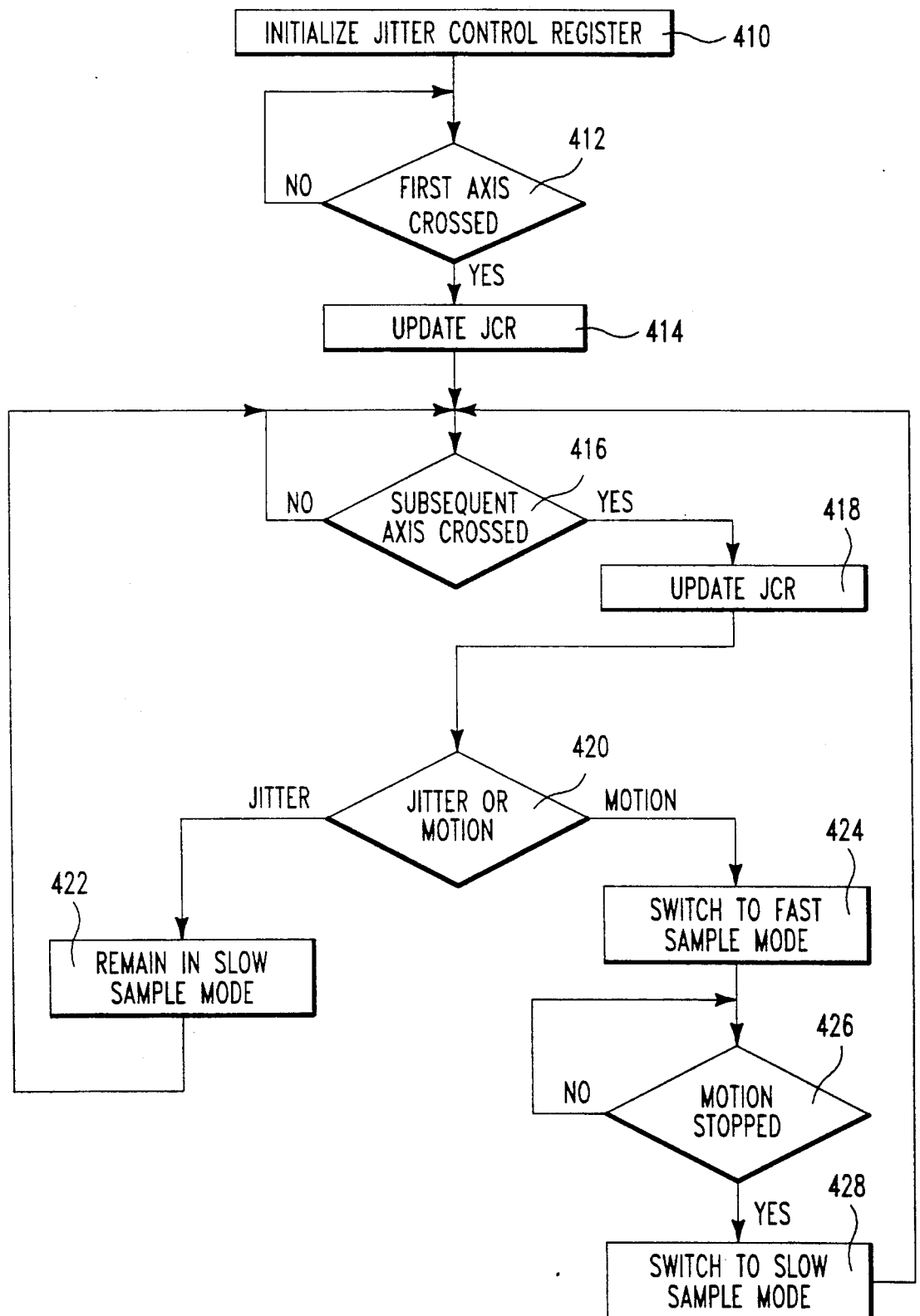
FIG. 4 is a flow-chart diagram for an exemplary program which controls the microcontroller shown in FIG. 2 to detect the jitter condition.

There is shown in FIG. 4 a flow diagram showing the jitter detection process. The jitter control register (JCR) is initialized in block 410. Three copies of initial data are stored in the three registers and this is considered the INITIAL state. Next, it is determined whether a first axis is crossed in decision block 412. The first axis crossing causes the JCR to be in the START-UP state is accepted as motion and the position tracker should be switched to enter the fast sampling rate mode. The JCR is updated to the START-UP state in block 414. Whether a subsequent axis is crossed is determined in decision block 416. The second or subsequent axis crossing causes the JCR to be neither the jitter nor motion states. If no axis is crossed, processing loops back until an axis crossing is detected. If an axis crossing is detected, the JCR is updated in block 418 and the JCR must be evaluated in decision block 420 to determine whether the axis crossing is jitter or motion. If the axis crossing is determined to be jitter, the system remains in the slow sample mode as shown in block 420 and processing loops back to determine whether a subsequent axis is crossed in block 416. If motion is shown by the JCR, the system is switched to the fast sample mode in block 424. Following the switching to fast sample mode 424, it is determined whether motion has stopped in decision block 426. When motion has stopped, the system is switched back to slow sampling mode and processing loops back to decision block 416 to determine whether a subsequent axis has been crossed.

The purpose of using the current, previous and next-most-previous quadrants is to determine whether the resolver has passed through three sequential quadrants, indicating that true motion has occurred. If the JCR contains quadrant information which does not indicate that the resolver has traversed three sequential quadrants but instead has passed from a first quadrant to a second and the back to the first, a jitter condition is evident. Other entries in the JCR Table 4 consist of illegal or invalid conditions. These entries are in the table as "filler" and are not valid states for the resolver but are merely shown to illustrate all possible combinations of the JCR.

In the present system, the JCR is implemented in the RAM of the microcontroller 220 (shown in FIG. 2). The look-up table shown in Table 4, is implemented in EEPROM 228 (shown in FIG. 2).

Figure 5:
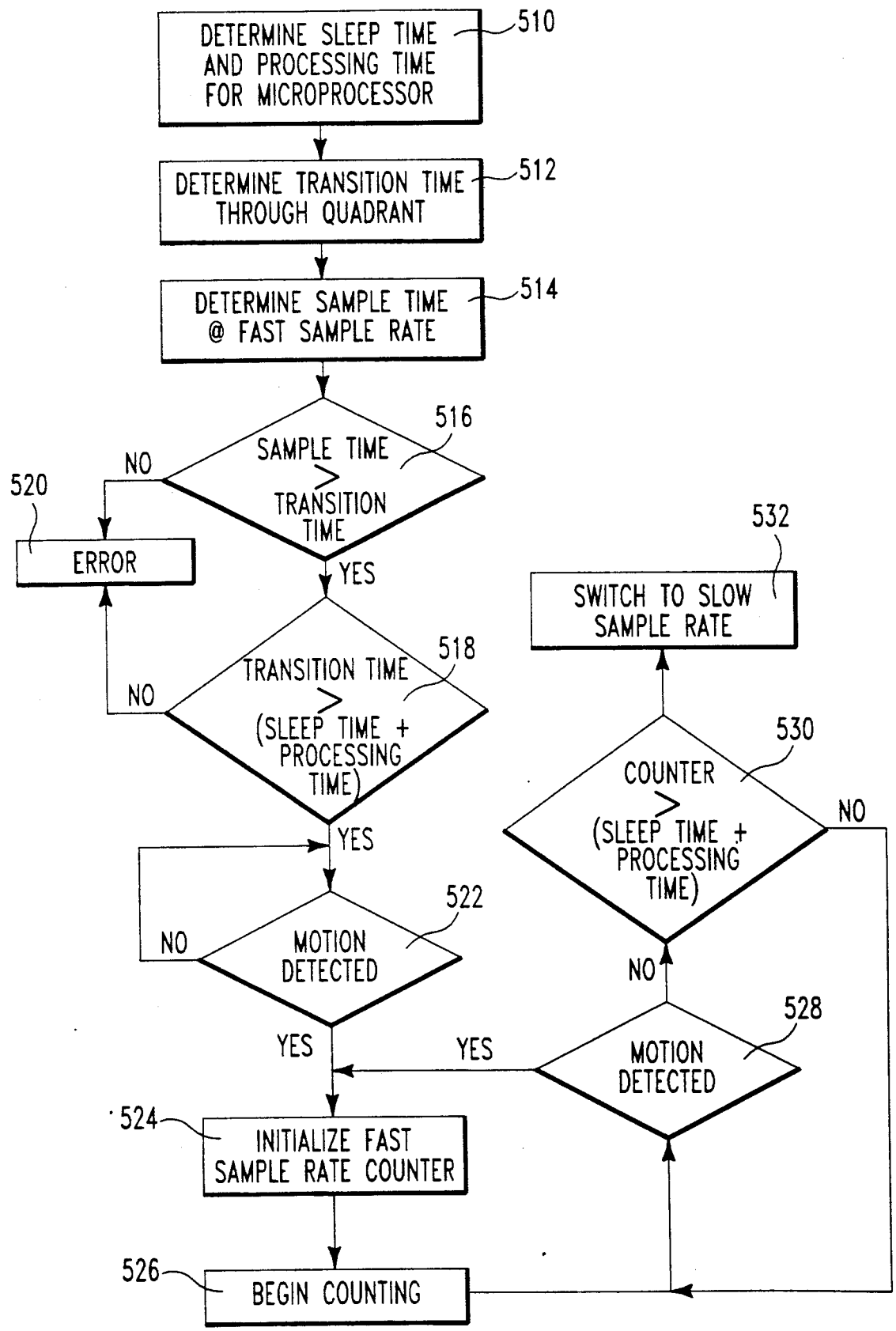
FIG. 5 is a flow diagram for an exemplary program which controls the microcontroller shown in FIG. 2 to determine when the present invention can switch from a fast sampling rate to a slow sampling rate.

FIG. 5 is a flow diagram for optimizing the data sampling in the present invention. Because of the concern with conserving power during an interruption of the main power supply, it is desirable to have the most efficient system for switching between the fast sampling rate and the slow sampling rate. The fast sampling rate consumes more power than the slow sampling rate and should thus be used sparingly (i.e. when motion is detected and continuing). Since the fast and slow sampling rates are essentially clock pulses, the most efficient implementation of the system determines the minimum number of fast data samples required before the data sampling rate can be decreased to the slow sampling rate. As will be apparent to those skilled in the art, this is equally true in any other system that can change its data periods at a fixed acceleration rate. In order to effectuate such a system, it is necessary to make certain determinations before the data sampling rate can be optimized for maximum power conservation. In the exemplary embodiment, these determinations made off-line and are input to the RPT 114 as constants.

Referring back to FIG. 5, it is first determined in block 510 what the sleep time and processing time is for the microcontroller 220. The sleep time is the amount of time in which the processor does not have to be actively sampling and interpreting the resolver position data to detect motion. Having a long sleep time would save power since the microcontroller is performing only minimal functions directed at motion detection during this time. The processing time is the amount of time necessary for the microprocessor to read and interpret the return signal from the excitation by the trapezoidal pulse signal. In block 512, the transition time through a quadrant (such as quadrant Q0 shown in FIG. 3a) is determined. The transition time determined in block 512 is actually the minimum transition time or the fastest time in which the resolver (and, thus the particular part of the robot device 110) can move through any quadrant. In block 514, it is determined what the sample time is at the fast sample rate. Information determined in blocks 510, 512 and 514 can be set up as initialized constant values or variable values that are updated as conditions for the system change. An example would be a change in data rates as performance of the robot is enhanced or diminishes depending on the particular application.

In block 516, it is determined whether the sample time of the fast sample rate is greater than the transition time of the resolver through a quadrant (such as quadrant $Q_0$). To effectively sample, it is necessary that the fast sample rate have a resolution sufficient to detect motion. This requires that the sample rate be faster than the fastest possible motion through a given quadrant. Similarly, in block 518, it is determined whether the transition time through a quadrant is greater than the sleep time plus the processing time of the microprocessor. If the transition time through a quadrant is less than the sleep time plus the processing time, the slow sampling rate will be unable to detect motion as it exceeds the time necessary to pass through a quadrant. Accordingly, in such a situation, the resolver would be able to pass completely through quadrant before motion would be detected in the subsequent quadrant. If either condition in block 516 or 518 is negative, an error condition results in block 520.

It is possible, however, that if block 518 results in the transition time being less than the sleep time plus the processing time, that the processor will merely maintain the fast sampling rate and not reset to the slow sampling rate. In such an operation, the negative outcome of 518 is not necessarily an error condition, but possibly an acceptable condition whereby the fast sampling rate is permanently maintained. As this system is used to optimize the data sampling rate's selection, it is more desirable to have access to a slower sampling rate. If motion is detected in block 522, a fast sampling rate counter is initialized in block 524 and counting begins in block 526. If motion is again detected in block 528, the fast sample rate counter is reinitialized in block 524 and loops back through block 526 to 528 until no motion is detected.

When no motion is detected, a comparison is done between the fast sample rate counter and the sleep time plus processing time in block 530. This comparison is actually a comparison of the amount of time taken up by the fast sampling rate. The fast sampling rate counter when multiplied by the period of the fast sampling rate results in the time expended in fast sampling. When this time is greater than the sleep and the processing time of the microprocessor, it is possible to sample at the slower rate. The switch to the slow sample rate is accomplished in block 532.

Another way to visualize the logic of FIG. 5 is to determine the number of fast sample rates which make up a slow sample rate. After motion has stopped and the number of fast sample rates detected exceed the period of the slow sample rate, effective monitoring can be done at the slow sample rate. For best operation, however, the count of fast sample rate periods is desirably reinitialized each time motion is detected. This assures that there is not motion and thus no need for the fast sampling rate. At this point, it is safe to switch to the slow sampling rate to conserve power.

The invention has been described in terms of an exemplary embodiment. It is contemplated, however, that it may be practiced with modifications as outlined above within the scope of the appended claims.

What is claimed:

1. An open circuit detection system for a resolver position tracking system (RPT), said RPT having a microprocessor and a position transducer having first and second windings, said system comprising:

excitation means for powering each of said first and second windings to cause each of said windings to return a signal to said microprocessor;

detection means including respective inverting and non-inverting signal amplifying means coupled to receive the signals provided by each of the first and second windings and to provide respective output signals, and means for determining whether the output signals of each of the inverting and non-inverting signal amplifying means have peak amplitude levels which are greater than a predetermined threshold value;

control means for signalling that an error condition has occurred when the detection means determines that the amplitude level of at least one of said output signals is not greater than the predetermined threshold value.

2. An open circuit detection system for a resolver position tracking system (RPT), said RPT having a microprocessor and a position transducer having a plurality of windings, said system comprising:

excitation means for powering each of said windings and returning an output signal for each of said windings;

at least one multiplexer having an output port, wherein said output signal for each of said windings is coupled to said multiplexer and said microprocessor cycles said multiplexer to cause it to provide each of said winding output signals in sequence;

an amplification stage comprising an inverting and non-inverting amplifier, each of said amplifiers connected to said output port of said multiplexer and each amplifier having an output terminal, said amplification stage configured to periodically produce a NOT OPEN signal when said winding output signals are present;

a threshold detector including at least two transistors, connected to each of said amplifier output terminals, respectively, said threshold detector configured to produce an output signal when said NOT OPEN signal is not present.

3. An open circuit detection system for a resolver position tracking system (RPT), said RPT having a microprocessor and a position transducer having a plurality of windings, said system comprising:

excitation means for powering each of said windings and returning a sine winding signal and a cosine winding signal for each of said windings;

a first and a second multiplexer, each having an output port, wherein said sine winding signal for each of said windings is connected to said first multiplexer and said cosine winding signal for each of said windings is connected to said second multiplexer and said microprocessor cycles each of said multiplexers to provide each of said respective sine and cosine winding signals in respective first and second sequence;

a first amplification stage connected to said first multiplexer output and a second amplification stage connected to said second multiplexer output port, each amplification stage comprising an inverting and non-inverting amplifier, each of said amplifiers connected to the output port of its respective multiplexer and each amplifier having an output terminal, said amplifiers of said first and second amplification stages configured to produce a NOT OPEN signal when said sine and cosine winding signals are present;

a first threshold detector including at least two transistors, each connected to a respectively different one of the amplifier output terminals of said first amplification stage and a second threshold detector including at least two transistors, each connected to a respectively different one of said amplifier output terminals in said second amplification stage, said first and second threshold detectors configured to produce an output signal when at least one of said winding signals is not returned from said windings.

* * * * *